Patented Mar. 1, 1932

1,847,518

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

O-AMINO-P-CRESOL-CARBOXYLIC-ACID AND PROCESS OF MAKING SAME

No Drawing. Application filed January 16, 1931, Serial No. 509,270, and in Germany January 23, 1930.

Our present invention relates to o-amino-p-cresol-carboxylic acid and to a process of making same.

The process of manufacture in accordance with this invention is by heating with carbonic acid at superatmospheric pressure an alkali metal salt of 1-methyl-2-amino-4-hydroxy-benzene.

Whereas m-amino-phenol-carboxylic acid (see German specification 50835) splits off its carboxylic acid group when heated with hydrochloric acid, the o-amino-p-cresol-carboxylic acid being object of the present invention is stable when likewise treated.

Since this acid exhibits an intense sherry-red coloration when mixed with ferric chloride, the carboxylic group is proved to have entered into an ortho-position relating to the hydroxy group. It represents probably 1-methyl-2-amino-4-hydroxy-benzene - 5 - carboxylic acid of the formula:

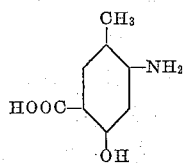

It is a valuable intermediate for the production of dyestuffs.

In order to further illustrate our invention, the following examples are given, the parts being by weight and all temperatures in centigrade degrees. We wish it, however, to be understood that we are not limited to the particular products nor reaction conditions mentioned therein.

Example 1

1230 parts of 1-methyl-2-amino-4-hydroxy-benzene are dissolved in 416 parts of caustic soda of 96% and 5000 parts of water in an autoclave provided with a stirrer and the water is distilled off, finally in vacuo, until the mass becomes entirely dry. Into the cold reaction mass carbonic acid is introduced until a pressure of 10 atmospheres and the whole is heated to 140° for 10 hours. The cold mass is dissolved in water. From the filtered solution the 1-methyl-2-amino-4-hydroxy-benzene-carboxylic acid is precipitated by means of hydrochloric acid. For further purification it is dissolved in sodium carbonate solution and again precipitated therefrom with an acid. When recrystallized from alcohol it melts at 164°. The alcoholic solution of this acid yields an intense sherry-red coloration after the addition of a dilute solution of ferric chloride.

Example 2

When in Example 1 the 416 parts of caustic soda are replaced by 560 parts of caustic potash and the process is otherwise carried on in the same way, a carboxylic acid is obtained which shows the same properties as the product of Example 1.

The temperature used may vary between 130 and 150°, the pressure between 10 and 50 atmospheres.

We claim:

1. A process for the manufacture of 1-methyl-2-amino-4-hydroxy-benzene-carboxylic acid which comprises heating to 130–150° with carbonic acid under a pressure of 10–50 atmospheres an alkali metal salt of 1-methyl-2-amino-4-hydroxy benzene.

2. As a new compound the 1-methyl-2-amino - 4 - hydroxy-benzene-carboxylic acid corresponding probably to the formula:

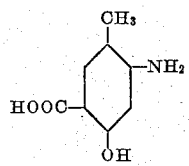

which compound melts when recrystallized from alcohol at 164° and shows when mixed with ferric chloride in an alcoholic solution an intense sherry-red coloration.

In testimony whereof, we affix our signatures.

LEOPOLD LASKA.
OSKAR HALLER.